(12) United States Patent  (10) Patent No.: US 7,748,938 B2
Winker  (45) Date of Patent: Jul. 6, 2010

(54) FASTENING ELEMENT

(75) Inventor: Alexander Winker, Spaichingen (DE)

(73) Assignee: Metallwarenfabrik Hermann Winker GmbH & Co. KG, Spaichingen (DE)

( * ) Notice: Subject to any disclaimer, the term of this patent is extended or adjusted under 35 U.S.C. 154(b) by 0 days.

(21) Appl. No.: 10/981,140

(22) Filed: Nov. 4, 2004

(65) Prior Publication Data

US 2005/0121574 A1   Jun. 9, 2005

(30) Foreign Application Priority Data

Nov. 4, 2003  (DE) ................. 103 52 126

(51) Int. Cl.
F16B 39/284 (2006.01)
F16B 37/08 (2006.01)
(52) U.S. Cl. ................. 411/111; 411/119; 411/432
(58) Field of Classification Search ......... 411/111–113, 411/119, 432
See application file for complete search history.

(56) References Cited

U.S. PATENT DOCUMENTS

| 1,768,505 | A | * | 6/1930 | Carr | 411/112 |
|---|---|---|---|---|---|
| 2,144,553 | A | * | 1/1939 | Simmonds | 411/111 |
| 2,243,923 | A | * | 6/1941 | Swanstrom | 411/113 |
| 2,303,148 | A | * | 11/1942 | Tinnerman | 411/111 |
| 2,409,209 | A | * | 10/1946 | Johnson | 411/111 |
| 2,571,786 | A | * | 10/1951 | Tinnerman | 411/112 |
| 2,585,728 | A | * | 2/1952 | Bedford, Jr. | 411/112 |
| 2,815,789 | A | * | 12/1957 | Hutson et al. | 411/111 |
| 2,991,816 | A | * | 7/1961 | Harbison et al. | 411/111 |
| 3,020,947 | A | * | 2/1962 | McKelvey | 411/111 |
| 3,123,120 | A | * | 3/1964 | Grimm | 411/111 |
| 3,126,038 | A | * | 3/1964 | Jaworski | 411/112 |
| 3,695,234 | A | * | 10/1972 | Buschbom et al. | 119/57.6 |
| 3,695,324 | A | * | 10/1972 | Gulistan | 411/111 |
| 3,765,078 | A | * | 10/1973 | Gulistan | 29/432 |
| 4,227,561 | A | * | 10/1980 | Molina | 411/103 |
| 4,695,212 | A | * | 9/1987 | Berecz | 411/85 |
| 4,863,327 | A | * | 9/1989 | Poupiter | 411/112 |
| 5,146,668 | A | * | 9/1992 | Gulistan | 29/525 |
| 5,380,136 | A | * | 1/1995 | Copple et al. | 411/183 |

(Continued)

FOREIGN PATENT DOCUMENTS

DE    22 17 490 B2    10/1973

(Continued)

OTHER PUBLICATIONS

European Search Report from EP 04 02 1517 mailed Feb. 18, 2005.

(Continued)

Primary Examiner—Victor Batson
Assistant Examiner—David Reese
(74) Attorney, Agent, or Firm—Kriegsman & Kriegsman

(57) ABSTRACT

A fastening element (10; 40) having a bracket (11; 41) and a receiving fixture (20; 50) for a nut body (33), the bracket (11; 41) having at least one bearing surface (16, 17; 46) for the receiving fixture (20; 50) and at least one holding element (14, 15; 43,44, 45) reaching over the receiving fixture (20; 50), and the receiving fixture (20; 50) being held by the bracket (11; 41) with play. The fastening element (10; 40) serves as a cage nut for connecting structural parts.

12 Claims, 2 Drawing Sheets

U.S. PATENT DOCUMENTS

| | | | |
|---|---|---|---|
| 5,468,104 A * | 11/1995 | Reid et al. | 411/113 |
| 5,507,517 A * | 4/1996 | Krawczak | 411/533 |
| 5,630,686 A | 5/1997 | Billmann | |
| 5,704,747 A | 1/1998 | Hutter, III et al. | |
| 6,183,180 B1 * | 2/2001 | Copple et al. | 411/107 |
| 6,811,363 B1 * | 11/2004 | Minnich | 411/104 |
| 6,918,725 B2 * | 7/2005 | Gauron | 411/112 |
| 7,114,900 B2 * | 10/2006 | Toosky | 411/108 |
| 7,516,534 B2 * | 4/2009 | Easterbrook et al. | 29/509 |
| 2002/0182027 A1 * | 12/2002 | Gauron | 411/112 |
| 2003/0091408 A1 | 5/2003 | Toosky | |
| 2003/0147715 A1 * | 8/2003 | Curley et al. | 411/111 |
| 2004/0005205 A1 * | 1/2004 | Yake et al. | 411/112 |
| 2004/0042868 A1 * | 3/2004 | Yake et al. | 411/111 |
| 2004/0109739 A1 * | 6/2004 | Clinch et al. | 411/112 |
| 2004/0136805 A1 | 7/2004 | Miller et al. | |
| 2004/0202523 A1 | 10/2004 | Csik | |

FOREIGN PATENT DOCUMENTS

| | | |
|---|---|---|
| DE | 32 37 952 C1 | 12/1983 |
| DE | 94 09 087 U1 | 8/1994 |
| DE | 94 09 977 U1 | 9/1994 |
| DE | 94 18 429 U1 | 2/1995 |
| DE | 195 00 995 A1 | 1/1996 |
| DE | 296 00 986 U1 | 4/1996 |
| DE | 195 33 138 C1 | 11/1996 |
| DE | 297 09 097 U1 | 7/1997 |
| DE | 200 17 234 U1 | 4/2001 |
| DE | 203 16 765 U1 | 2/2004 |
| DE | 103 08 673 A1 | 9/2004 |
| EP | 0 444 979 A1 | 9/1991 |
| EP | 0 685 658 B1 | 12/1995 |
| EP | 0 896 852 A2 | 2/1999 |
| EP | 1 116 890 A1 | 7/2001 |
| FR | 1 403 611 A | 6/1965 |
| FR | 2 574 877 A1 | 6/1986 |
| FR | 2 699 235 A1 | 6/1994 |
| FR | 2 730 771 A1 | 8/1996 |
| GB | 661221 A | 11/1951 |

OTHER PUBLICATIONS

TEXTRON sales literature entitled Floating Cage Nuts.

* cited by examiner

FASTENING ELEMENT

BACKGROUND OF THE INVENTION

The present invention relates to a fastening element.

Fastening elements in the form of so-called cage nuts are known, for example from DE 94 09 087.4. The cage nut which is described there constitutes a part of a screw-nut joint by which structural parts are joined together. In order to simplify the assembly, the cage nut is preassembled on a structural part by means of a mounting in the region of the pass-through opening intended for the screw bolt, for example by electric welding. When the screw bolt is later screwed into the nut thread, the mounting offers a rotationally secure support for the nut. At the same time, the mounting prevents deflection of the nut in the axial direction of the screw bolt. The screw bolt can thereby be screwed into the nut without this having to be fixed manually or with the aid of tools. For the compensation of tolerances or of tensions arising after the assembly, the nut is held in the mounting with play.

This known fastening element is of very solid, bulky and complex construction. For the reception into the mounting, no standard nuts can be used, but rather a specially configured nut is needed. Moreover, there is the danger of an electrical contact between the nut and the mounting. This can result, especially in vehicle body construction, in the nut being wholly or partially coated with paint during dip painting, for example, which is undesirable.

SUMMARY OF THE INVENTION

Accordingly, the object of the present invention consists in configuring a fastening element of this type such that it consists of a small number of structural parts, is cheap to make and is of easy-fitting and space-saving design. It is further intended to be suitable for the use of standard nuts.

The solution consists in a fastening element having the features of claim 1. According to the invention, a bracket and a receiving fixture for a nut body are provided, the bracket having at least one bearing surface for the receiving fixture and at least one holding element reaching over the receiving fixture, and the receiving fixture being held by the bracket with play.

The fastening element according to the invention consists of just two structural parts, which are of light and space-saving construction and can be captively joined together. The receiving fixture can be provided with an opening, which is shaped according to choice, for the insertion of all type of nuts, especially hexagon standard nuts. The fastening element according to the invention is thus versatile and can be used in a confined space and the manufacture of specially matched nuts is eliminated. This also allows economical production and use of the fastening element according to the invention. Further, the fastening element according to the invention can be delivered preassembled to the place of assembly, if necessary also with already inserted nut body.

The combination of bearing surface and holding element reaching over the receiving fixture produces a tilt-safe arrangement of the receiving fixture in the bracket, so that additional means for preventing a tilting motion of the nut as the screw bolt is applied and screwed in are unnecessary. At the same time, the receiving fixture is accommodated in the bracket with play, at least in the horizontal plane, but also, if desired, in the vertical plane. Moreover, as the screw bolt is screwed in, the receiving fixture transmits the torque of the screw and absorbs the rotation forces.

The subject matter of the present invention is additionally a fastening element of this type, in which a nut body is accommodated.

Advantageous refinements are derived from the subclaims.

The bracket can consist, for example, of a metal material, so that it can be attached to a metal structural part, for example by welding, e.g. electric welding or spot-welding. The bracket can also, however, be made of any other suitable material such as plastic, composite material, etc. and can be fastened to a structural part in any way which is appropriate in the individual case, such as, for example, by means of glued, plug-in, rivet or clamped joints.

The receiving fixture preferably consists of a plastics material or some other electrically insulating material. An electrical contact between the nut or the nut/screw joint and the bracket is thus prevented, since the torque is transmitted via the receiving fixture and not via the nut itself. Consequently, during a cathodic dip painting, for example, a coating of paint on the screw is prevented. In a particularly preferable arrangement, the play of the receiving fixture is dimensioned such that a nut body inserted in the receiving fixture has a distance to the bracket which prevents the electrical contact between nut body and bracket. Further, an electrical contact between nut body and structural part can be prevented by the nut being pushed into the receiving fixture and being pulled onto the structural part only when the nut body is tightened.

Of course, other materials, including electrically conductive materials, can also be used to make the receiving fixture.

A preferred embodiment of the fastening element according to the invention consists in the bracket having at least two side members with bearing surfaces for the receiving fixture, the side members being joined together by web-shaped holding elements. In this case, the receiving fixture is preferably provided with projections, which, on the one hand, rest on the bearing surfaces and, on the other hand, undergrip the web-shaped holding elements. The receiving fixture is thus tilt-safe and is held in the bracket such that it can be moved horizontally. This embodiment can both be of rectangular or square configuration, and also of round, circular, oval or elliptical configuration.

An alternative embodiment envisages that the bracket is of annular configuration and is provided with at least two holding elements extending radially inwards. The bracket can here be of annular, oval, elliptical or polygonal shape. In this case, the receiving fixture is preferably of disc-shaped configuration and its contour can be matched, in particular, to the external shape of the bracket. Corresponding to the radially extending holding elements, the receiving fixture has, on its outer periphery, recesses, in which the holding elements engage. This design, too, allows a tilt-safe and horizontally mobile connection of the receiving fixture to the bracket.

Preferably, the distance between the at least one bearing surface and the at least one holding element is matched to the thickness of the receiving fixture, so that a tilt motion of the receiving fixture is completely prevented.

The receiving fixture can have an opening, which in shape and size is matched to the nut body in such a way that the nut body is held in a clamping and movable manner in the receiving fixture. The fastening element according to the invention is thus suitable for use with all conceivable nut types. Furthermore, a distance to the structural part is guaranteed, which distance prevents an electrical contact between the nut body and the structural part prior to assembly. In the assembly, the nut body is then pulled downwards onto the structural part. In particular, the opening can, be of round, slot-shaped or polygonal, for example hexagonal, configuration.

Advantageously, on the inner face of the opening there can be provided at least one material elevation, which aids the clamping of the nut body. This material elevation can be configured in the form of a camber, a web, a projection, a knob or the like. The material elevation can be dimensioned such that the clamping force is so high that nuts without radial collar can be used and cannot be forced out of the receiving fixture as the screw is screwed in. Instead, in a manner which is known per se, projections or material thicknesses can be provided on the nut body, which are attached after the nut has been introduced into the receiving fixture and prevent it from being forced out.

BRIEF DESCRIPTION OF THE DRAWING

The invention is described in greater detail with reference to illustrative embodiments represented in the appended figures, in which.

DETAILED DESCRIPTION OF THE INVENTION

Figure 1:
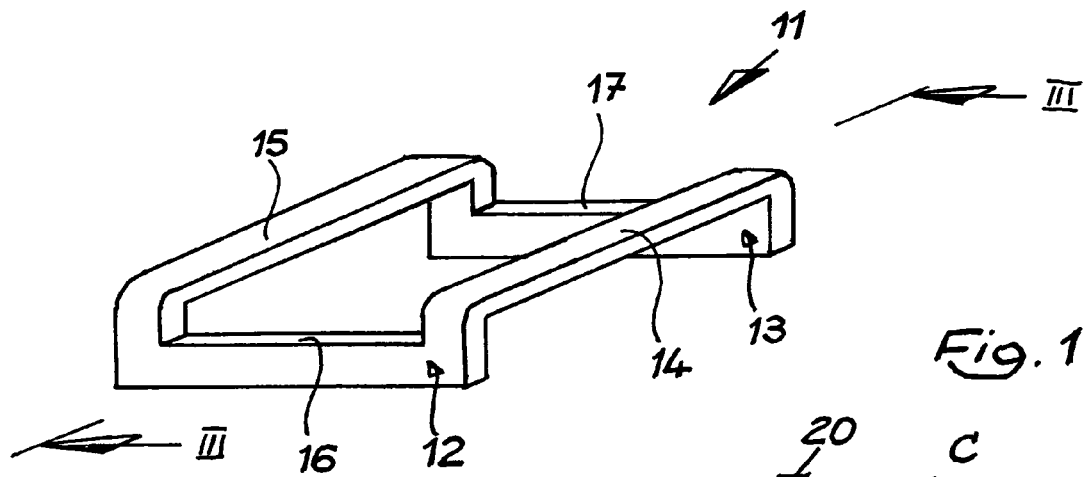
FIG. 1 shows a perspective view of a first embodiment of a bracket for a fastening element according to the invention in diagrammatic, non-scale representation.
Figure 3:
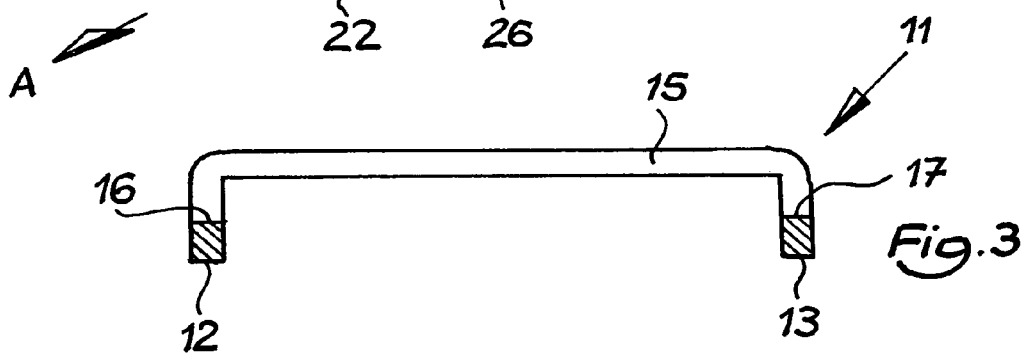
FIG. 3 shows a section along the line III-III in FIG. 1.

The fastening element 10 according to the invention essentially comprises a bracket and a receiving fixture. One embodiment of a bracket 11 is represented in FIGS. 1 and 3. This bracket 11 is stirrup-shaped and has two side members 12, 13 joined together by web-shaped holding elements 14, 15. Each side member 12, 13 has a bearing surface 16, 17, the bearing surfaces 16, 17 being disposed at a distance to the holding elements 14, 15. The bracket 11 preferably consists of a metal material, for example steel.

Figure 2:
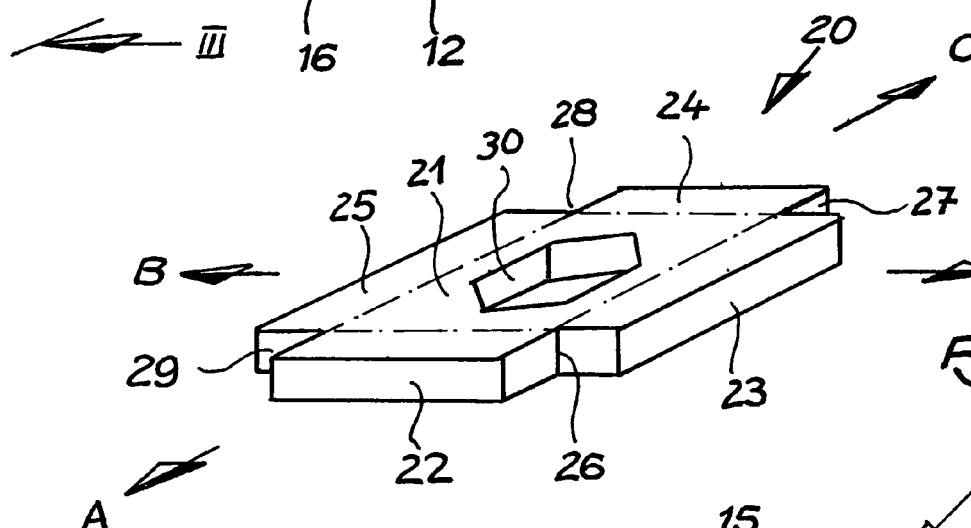
FIG. 2 shows a perspective view of a first embodiment of a receiving fixture for a fastening element according to the invention in diagrammatic, non-scale representation.

An illustrative embodiment of a receiving fixture 20 is represented in FIG. 2. The receiving fixture 20 has a basic element 21 indicated by dash-dot lines, which, in the illustrated embodiment, is rectangular in shape. Along all four sides of the basic element 21, projections 22, 23, 24, 25, which in the illustrative embodiment are cuboidal, are moulded on. Recesses 26, 27, 28, 29 are formed through the arrangement of these projections 22, 23, 24, 25 on the basic element 21. In the illustrative embodiment, an opening 30 which has a hexagonal shape is configured in the middle of the basic element 21. The receiving fixture 20 preferably consists of a non-electrically-conductive material, for example a plastics material.

Figure 4:
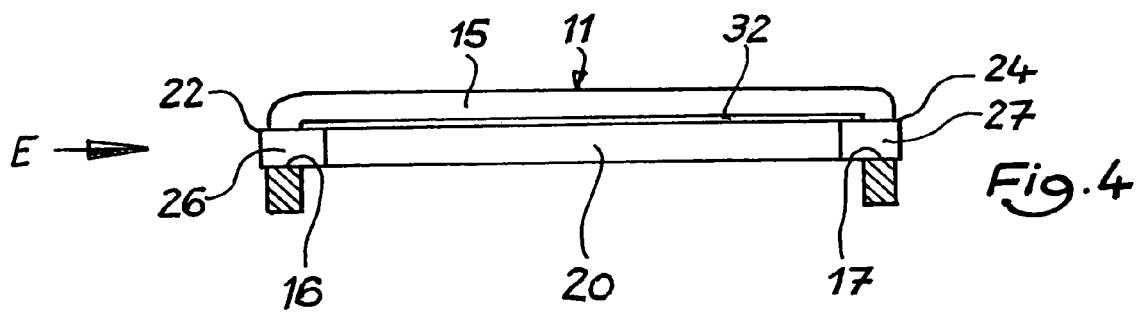
FIG. 4 shows the representation according to FIG. 3 with the receiving fixture from FIG. 2.
Figure 5:
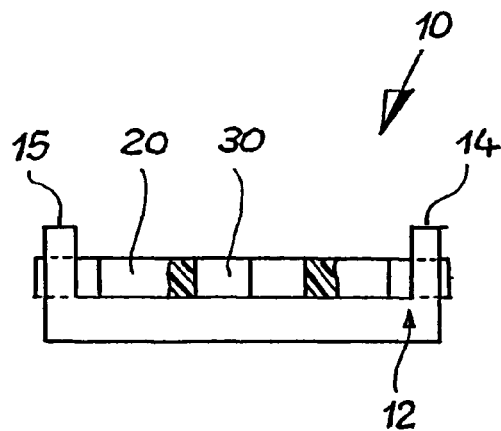
FIG. 5 shows the representation according to FIG. 4, viewed in the direction of the arrow E.

From FIGS. 4 and 5 it can be seen how the bracket 11 and the receiving fixture 20 are put together to form the fastening element 10 according to the invention. The receiving fixture 20 bears with the projections 22 and 24 upon the bearing surfaces 16 and 17 of the bracket 11, whilst the holding elements 14 and 15 of the bracket 11 reach over the projections 23 and 25 of the receiving fixture 20. An interspace 32 is herein left between the top side of the receiving fixture 20 and the bottom side of the holding elements 14, 15. The receiving fixture 20 is thereby able to move horizontally in the bracket 20 in the direction of the arrows A, B, C, D in FIG. 2. The recesses 26, 27, 28, 29 and their end faces constitute stop shoulders, which butt against the vertical regions of the side members 12, 13 and thus limit the extent of the horizontal motion of the receiving fixture 20 in the bracket 11.

The bracket 11 and the receiving fixture 20 are herein mutually coordinated in terms of their dimensions such that, upon the horizontal motion, a nut body 33 inserted in the receiving fixture 20 (cf. FIG. 6) does not touch the bracket 11.

If so desired, the interspace 32 can also, however, be dimensioned such that a vertical motion of the receiving fixture 20 in the bracket 11 is possible, without any incidence of a tilting motion when the screw bolt is applied and screwed in.

Figure 6:
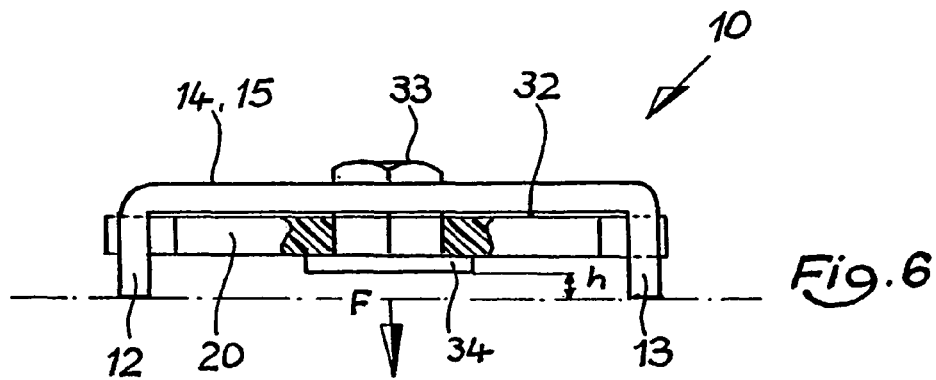
FIG. 6 shows the representation according to FIG. 4 with nut body inserted in the receiving fixture.

FIG. 6 shows the fastening element 10 with inserted nut body 33, the surface of a structural part being indicated in dash-dot representation. In the illustrative embodiment, it is a case of a standard hexagon nut having a collar 34. The nut body 33 is held in a clamping and axially movable manner in the receiving fixture 20. Prior to the assembly, it has a distance h to the surface of the structural part. An electrical contact between the nut body and the structural part prior to the assembly is thereby prevented.

The unit comprising fastening element 10 and nut body 33 and shown in FIG. 6 serves to connect two or more structural parts, for example in motor vehicles. The fastening element 10 is firstly fixed by the bottom side of its side members 12, 13 over a bore on a structural part, for example by welding, gluing, plugging in, clamping, or the like. Next, one or more further structural parts are orientated such that their bores are in alignment and the screw bolt is screwed into the nut body 33 from the side facing away from the fastening element 10. As soon as the screw head of the screw bolt makes contact upon the far-side structural part, the continuation of the rotation motion of the screw bolt results in the nut body being pulled in the direction of the arrow F onto the surface of the near-side structural part. The horizontal mobility of the receiving fixture 20 and of the nut body 33 serves to compensate position tolerances between the nut body and the bores when the fastening element 10 is fixed on the structural part.

The fastening element 10 can be manufactured by the bracket 11 being punched out, for example, as a flat structural part and by the receiving fixture 20 being made, for example, as a plastics injection moulding or milled part. Next, the side members 12, 13 of the bracket 11 are bent slightly, at an acute angle, to the extent that the receiving fixture 20 is able to be inserted. After this, the side members 12, 13 are bent over fully into their vertical position.

Figure 7:
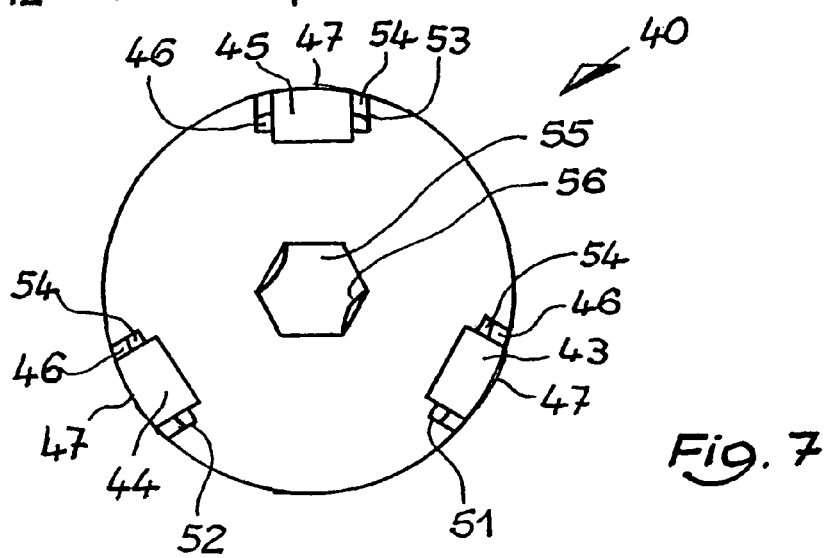
FIG. 7 shows a top view of a second embodiment of the fastening element according to the invention, comprising bracket and receiving fixture.
Figure 8:
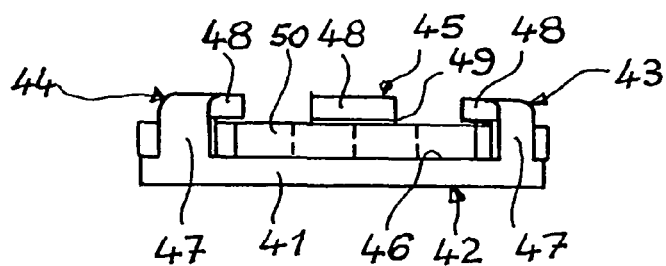
FIG. 8 shows the fastening element from FIG. 7 in a side view.

FIGS. 7 and 8 show a second illustrative embodiment of a fastening element 40 with annular bracket 41 made of a metallic material, for example steel, and disc-shaped receiving fixture 50 made of an electrically insulating material, for example plastic. The bracket 41 comprises a base 42 and at least two, in the illustrative embodiment three, holding elements 43, 44, 45 extending radially inwards. In the illustrative embodiment, the base 42 is annular but can also, for example, be oval, elliptical or polygonal. The base 42 has a bearing surface 46 for the receiving fixture 50. The holding elements 43, 44, 45 are moulded onto the base 42 and, in the illustrative embodiment, comprise axially extending stays 47 having claws 48 bent radially inwards.

In the illustrative embodiment, the receiving fixture 50 has an external contour matched to the shape of the base 42, and an opening 55 for receiving a nut body 33. In the illustrative embodiment, the opening 55 is provided on the inner face with two material elevations 56, which reinforce the clamping of the nut body 33. This effect can be so great that even nut bodies 33 without a collar can be used without the nut body 33 being forced out of the opening 55 as the screw bolt is screwed in.

In addition, in the region of the stays 47 of the bracket 41, recesses 51, 52, 53 are provided which embrace the stays 47. The recesses 51, 52, 53 are dimensioned such that an interspace 54 remains between them and the stays 47. The distance between the bottom sides of the claws 48 and the bearing surface 46 of the bracket 41 is, in turn, dimensioned such that a further interspace 49 remains between the claws 48 and the receiving fixture 50. The interaction of the interspace 49 and the interspaces 54 gives rise, in turn, to the horizontal mobility of the receiving fixture 50 in the bracket 41. The extent of the horizontal motion of the receiving fixture 50 is limited by the stays 47, the side faces of the recesses 51, 52, 53 serving as stop faces.

The working method of the fastening element 40 corresponds to that of the fastening element 10. In particular, the limitation of the horizontal motion of the receiving fixture 50 serves to ensure that an inserted nut body 33 does not touch the bracket 41. Similarly, the nut body 33 is held, prior to the assembly, at a distance to the structural part to be fastened.

The bracket 41 of the fastening element 40 can be made, for example, as a stamped metal part or a turned part, a plastics receiving fixture 50 by injection moulding or milling, for example.

The inventive fastening element with nut body thus constitutes a cheap and versatile cage nut.

The invention claimed is:

1. Fastening element having a metallic bracket and a non-electrically-conductive receiving fixture for holding a nut body, the bracket having two side members and two holding elements, each of the two side members having a bearing surface for the non-electrically conductive receiving fixture, the two side members being joined together by the holding elements, the holding elements reaching over the receiving fixture, and the receiving fixture being held by the bracket with play such that the receiving fixture is movable, relative to the bracket, in all directions in a horizontal plane resting on the at least one bearing surface of the bracket, and such that the nut body inserted in the receiving fixture does not come into electrical contact with the bracket.

2. Fastening element according to claim 1, characterized in that the receiving fixture consists of a plastics material.

3. Fastening element according to claim 1, characterized in that the bracket is of annular configuration and is provided with at least two holding elements extending radially inwards.

4. Fastening element according to claim 3, characterized in that the receiving fixture is of disc-shaped configuration and, corresponding to the radially inwardly extending holding elements, has, on its outer periphery, recesses.

5. Fastening element according to claim 1, characterized in that the distance between the bearing surfaces and the holding elements substantially matches the thickness of the receiving fixture.

6. Fastening element according to claim 1, characterized in that the receiving fixture has an opening, which in shape and size is matched to the nut body in such a way that the nut body is held in a clamping and movable manner in the receiving fixture.

7. Fastening element according to claim 6, characterized in that the opening is of round, oblong or polygonal configuration.

8. Fastening element according to claim 6, characterized in that on the inner face of the opening there is provided at least one material elevation, which aids the clamping of the nut body.

9. Fastening element according to any one of the preceding claims, characterized in that a nut body is accommodated in the receiving fixture.

10. Fastening element according to claim 9, characterized in that the nut body is provided with a radial collar.

11. Fastening element according to claim 9, characterized in that the nut body is provided with projections for securing the nut in the receiving fixture.

12. Fastening element comprising a bracket and a non-electrically-conductive receiving fixture for holding a nut body, the bracket being metallic and comprising at least one bearing surface for the receiving fixture and at least one holding element reaching over the receiving fixture, the receiving fixture being non-electrically conductive and being held by the bracket with play such that the receiving fixture is movable, relative to the bracket, in all directions in a horizontal plane resting on the at least one bearing surface of the bracket and such that the nut body inserted in the receiving fixture does not come into electrical contact with the bracket, the receiving fixture comprising a planar basic element of rectangular shape and a plurality of cuboidal projections, with one of said cuboidal projections being disposed on each of four sides of the planar basic element and with recesses being formed by an arrangement of the cuboidal projections on the planar basic element.

\* \* \* \* \*